Nov. 22, 1927.  
M. C. LASKY  
1,649,905  
DENTAL BRIDGE  
Filed Sept. 11, 1925
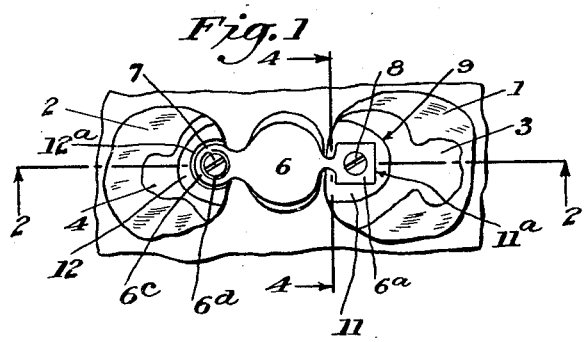
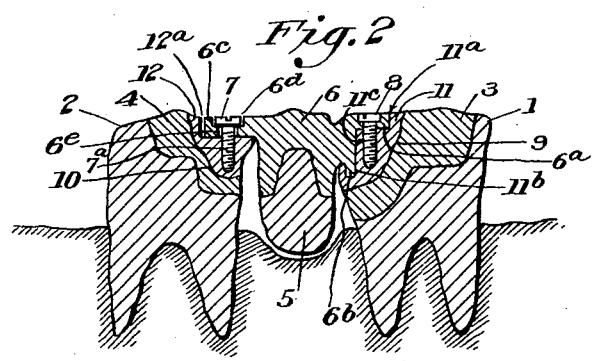
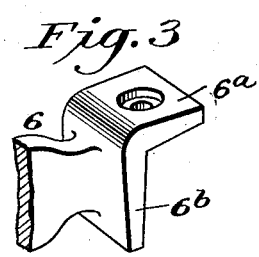 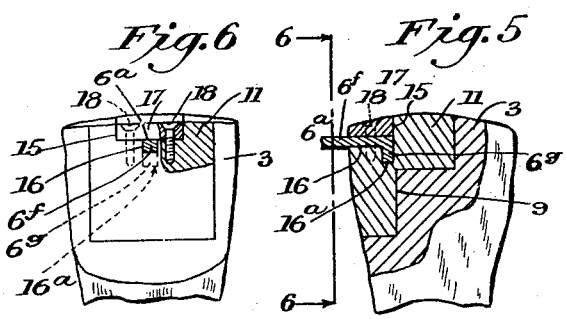
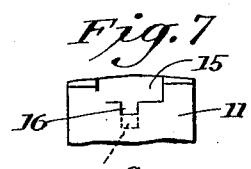
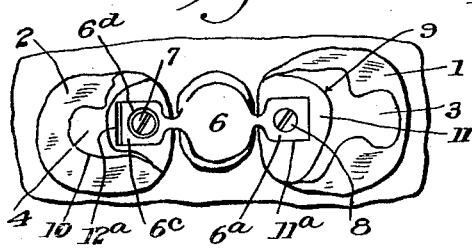
Inventor  
Mervyn C. Lasky,  
By A. B. Bowman  
Attorney Patented Nov. 22, 1927.

1,649,905

UNITED STATES PATENT OFFICE.

MERVYN C. LASKY, OF HOLLYWOOD, CALIFORNIA.

DENTAL BRIDGE.

Application filed September 11, 1925. Serial No. 55,643.

My invention relates to dental bridges, more particularly to that class of dental bridges known as fixed bridges, but it may be removed for cleaning and for cleaning between the bridge supported tooth and the gum, and the objects of my invention are first, to provide a dental bridge of this class which is substantially fixed, but which may be removed by a dentist for cleaning purposes; second, to provide a bridge of this class in which the bridge is fixed to one adjacent stationary tooth, but so supported that it will permit slight lateral movement of the bridge relative to the teeth, and of one stationary tooth relative to the other, to permit the natural movement of the teeth in action; third, to provide a bridge of this class which is substantially fixed, except when it is desired to remove the same; fourth, to provide a novelly constructed dental bridge of this class, and fifth, to provide a dental bridge of this class which is very simple and economical of construction, durable, easy to install, and with the proper tools, easy to remove, and which will not readily deteriorate or get out of order.

With these and other objects in view as will appear hereinafter my invention consists of certain novel features of construction, combination, and arrangement of parts and portions as will be hereinafter described in detail and particularly set forth in the appended claims, reference being had to the accompanying drawings and the characters of reference thereon, which form a part of this application in which:

Figure 1 is a top or plan view on an enlarged scale showing my dental bridge in its preferred form shown mounted on two stationary teeth, and the teeth positioned in the gum. Fig. 2 is a sectional view through 2—2 of Fig. 1. Fig. 3 is an enlarged detailed perspective view of one portion of the bridge. Fig. 4 is a plan view showing the bridge in a slightly modified form from that of the other views of the drawing. Fig. 5 is a fragmentary sectional view similar to Fig. 2 of another modified form of my invention, and Fig. 6 is a vertical sectional view taken on line 6—6 of Fig. 5. Fig. 7 is an elevational view of the inlay shown in Figs. 5 and 6.

Similar characters of reference refer to similar parts and portions throughout the several views of the drawings.

The stationary tooth 1, stationary tooth 2, filling 3, filling 4, bridge supported tooth 5, bridge member 6, screw 7, and screw 8 constitute the principal parts and portions of my dental bridge in its preferred form.

The stationary teeth 1 and 2 are the regular teeth of the mouth wherever positioned, and the bridge is used to fill a space where a tooth has been removed between the teeth 1 and 2. The tooth 1 is provided with a filler, or inlay 3 in its upper surface. In the inner upper corners of the fillings 3 and 4 are cut recesses 9 and 10 respectively, in which are fitted inlays 11 and 12 respectively after the fillings 3 and 4 are set in the teeth 1 and 2. The inlay 11 is provided with a substantially rectangular shaped recess 11ª in its upper surface, and with a downwardly extending long narrow recess 11ᵇ near the edge of the tooth filling. The inlay 12 in the tooth 2 is provided with a circular recess 12ª in its upper side. The bridge 6 is constructed of an inlay or filler in the form of the upper surface or crown of a tooth to which the tooth 5 is secured and supported thereby, the lower end of the tooth extending down slightly into the cavity left by the removal of the natural tooth.

This bridge 6 is provided with a substantially rectangular shaped portion 6ª which is adapted to fit into the recess 11ª in the inlay 11, and with a downwardly extending tapered projecting portion 6ᵇ, which is adapted to fit into the cavity 11ᵇ in the inlay 11, thus making a substantial fit on the bridge member 6 with the secondary filling 11. This bridge member is further supported by means of a screw 8 which fits centrally in the portion 6ª and screws down into a threaded hole 11ᶜ in the inlay 11, thus rigidly securing the bridge member 6 to the inlay 11, and supported substantially by the member 6ᵇ in the cavity 11ᵇ. The other side of the bridge 6 is provided with a circular metallic portion 6ᶜ which is provided with a recess 6ᵈ in its upper surface, and with a hole 6ᵉ extending from the bottom of this recess 6ᵈ through the member 6ᶜ. Mounted in this recess 6ᵈ of the hole 6ᵉ is a screw 7 which extends down into the inlay 12 and is secured thereto by means of threads 7ª screwed into a threaded hole in the inlay 12.

It will be here noted that the recess 6ᵈ is considerably larger than the head of the screw 7, and the hole 6ᵉ is considerably larger than the body of screw 7, thus permitting slight lateral movement of the bridge member 6 relatively to the inlay 12 and therefore the tooth 2.

It will also be noted that the member 6ᶜ is slightly smaller in diameter than the recess 12ᵃ which also permits relative movement of the bridge 6 relatively to the inlay 4, thus assuring sufficient relative movement of the teeth 1 and 2 to provide for their natural movement. In the modified form of construction shown in Fig. 4 of the drawings, both ends of the bridge form are substantially rectangular shaped, the one end being the same as that shown in the other views of the drawing, and the other is rectangular shaped instead of round, and the screw head and body and bridge member have sufficient clearness to permit relative movement.

In the modified form of my invention shown in Figs. 5 and 6, the inlay 11 is formed with a recess 15 in its upper inner corner and with a groove 16 in the bottom of said recess extending inwardly from the edge of the inlay and formed with a depending socket 16ᵃ at its inner end. The end portion 6ᵃ of the bridge 6 is made in the form of a shank 6ᶠ with its end 6ᵍ bent downwardly at right angles. The shank 6ᶠ fits in the groove 16 while the end 6ᵍ fits in the socket 16ᵃ. A plate 17 fits in the recess 15 over the shank 6ᶠ and screws 18 are driven through said plate into the inlay whereby the shank 6ᶠ and end 6ᵍ are held firmly in the groove 16 and socket 16ᵃ respectively, thus holding one end of the bridge fixed to the tooth 1.

By means of the inlays 11 and 12 the bridge 6 may be conveniently fitted between the teeth without the necessity of taking out the fillings 3 and 4.

Though I have shown and described a particular construction, combination, and arrangement of parts and portions, and a certain modification thereof, I do not wish to be limited to this particular construction, combination, and arrangement, nor to the modification, but desire to include in the scope of my invention the construction, combination, and arrangement substantially as set forth in the appended claims.

Having thus described my invention, what I claim as new and desire to secure by Letters Patent is:

1. In a dental bridge, the combination with two spaced apart stationary teeth, of inlays in the upper and adjacent side surfaces of said teeth, a bridge member supporting a tooth provided on one end with a rectangular shaped portion and an extended portion fitting into conforming recesses in the inlay portion of one of said teeth on one side, and a circular member on the other side of said bridge fitting into a conforming recess in the inlay of the opposite tooth, with clearance spacing between said bridge and said last mentioned inlay.

2. In a dental bridge, the combination with two spaced apart stationary teeth, of inlays in the upper and adjacent side surfaces of said teeth, a bridge member supporting a tooth provided on one end with a rectangular shaped portion and an extended portion fitting into conforming recesses in the inlay portion of one of said teeth on one side, and a circular member on the other side of said bridge fitting into a conforming recess in the inlay of the opposite tooth, with clearance spacing between said bridge and said last mentioned inlay, and screws fitted into the opposite sides of said bridge, and extending down into the inlay portions of said teeth.

3. In a dental bridge, the combination with two stationary teeth provided with inlays in their upper surfaces, of a bridge member supporting an artificial tooth between said teeth and provided with extended portions fitting into recesses in said inlay portions, means for removably fitting said extended portions into said inlaid portions, and consisting of screws screwed into said inlay portions, and fitting in recess in said extended portions of said bridge, there being provided clearance on one side of said bridge between said screw and said bridge, and between the bridge and the said inlaid portion.

4. In a dental bridge, the combination with a pair of spaced apart anchor teeth, of a bridge positioned between said teeth, rigidly but readily detachably secured at one end to one of said teeth and movably mounted at its other end on the other of said teeth to permit horizontal movement of one end of the bridge relative to the last mentioned tooth.

5. In a dental bridge, the combination with a pair of spaced apart anchor teeth having recesses at their adjacent sides, of a dental bridge positioned between said teeth and provided with extended portions fitting in the recesses of said anchor teeth, the one extended portion being fixed but readily detachably secured to the one anchor tooth and the other extended portion being yieldably mounted in the recess of the other tooth to permit horizontal movement of one end of the bridge relative to the last mentioned tooth.

In testimony whereof, I have hereunto set my hand at Los Angeles, California, this 2nd day of September, 1925.

MERVYN C. LASKY.